(12) United States Patent
Van Belzen et al.

(10) Patent No.: US 11,365,161 B2
(45) Date of Patent: *Jun. 21, 2022

(54) UREA AMMONIUM SULPHATE-BASED COMPOSITION AND METHOD FOR THE MANUFACTURE THEREOF

(71) Applicant: YARA INTERNATIONAL ASA, Oslo (NO)

(72) Inventors: Ruud Van Belzen, Middelburg (NL); Filip Colpaert, Zwijnaarde (BE)

(73) Assignee: YARA INTERNATIONAL ASA, Oslo (NO)

( * ) Notice: Subject to any disclaimer, the term of this patent is extended or adjusted under 35 U.S.C. 154(b) by 84 days.

This patent is subject to a terminal disclaimer.

(21) Appl. No.: 17/053,325

(22) PCT Filed: May 7, 2019

(86) PCT No.: PCT/EP2019/061641
§ 371 (c)(1),
(2) Date: Nov. 5, 2020

(87) PCT Pub. No.: WO2019/215123
PCT Pub. Date: Nov. 14, 2019

(65) Prior Publication Data
US 2021/0230080 A1    Jul. 29, 2021

(30) Foreign Application Priority Data

May 7, 2018  (EP) ..................................... 18171045

(51) Int. Cl.
*C05C 9/00*         (2006.01)
*C05G 5/12*         (2020.01)
(Continued)

(52) U.S. Cl.
CPC .............. *C05C 9/005* (2013.01); *C05C 3/005* (2013.01); *C05D 9/02* (2013.01); *C05G 1/00* (2013.01);
(Continued)

(58) Field of Classification Search
None
See application file for complete search history.

(56) References Cited

U.S. PATENT DOCUMENTS 3,785,796 A * 1/1974 Mann, Jr. ................ C05C 3/005
                                                    71/61
4,530,714 A    7/1985 Kole et al.
(Continued)

FOREIGN PATENT DOCUMENTS

CN    103896672 A    7/2014
CN    103896673 A    7/2014
(Continued)

OTHER PUBLICATIONS

Wang, "Fertilizer Development and Processing 2nd Edition", China Agricultural University Press, pp. 55-57, Jun. 30, 2011.
(Continued)

*Primary Examiner* — Wayne A Langel
(74) *Attorney, Agent, or Firm* — Dilworth IP, LLC

(57) ABSTRACT

The invention relates to a homogeneous, solid, particulate, urea ammonium sulphate (UAS)-based composition comprising urea ammonium sulphate, a urease inhibitor of the type phosphoric triamide and magnesium sulphate, characterized in that the UAS-based composition comprises 0.02 to 1 weight % of magnesium sulphate, 0.0001 to 1 weight % of the urease inhibitor and about 5 to about 30 weight % of ammonium sulphate. The composition according to the invention has improved properties for reducing ammonia loss by urease activity in the soil and is in particular suitable (Continued)

as a fertilizer. The invention further relates to a method for the manufacture of a homogeneous, solid, particulate urea ammonium sulphate-based composition comprising urea, ammonium sulphate and a urease inhibitor of the type phosphoric triamide, in particular N-(n-butyl) thiophosphoric triamide (nBTPT), as well as to a composition of kit of parts comprising an amount of a) magnesium sulphate; b) a urease inhibitor of the type phosphoric triamide, preferably N-(n-butyl) thiophosphoric triamide (nBTPT); c) optionally, an alkaline or alkaline-forming compound, selected from the group of calcium oxide, zinc oxide, magnesium oxide, calcium carbonate, and mixtures thereof, and d) optionally, one or more anti-caking and/or moisture-repellent and/or anti-dust compounds.

31 Claims, 5 Drawing Sheets

(51) Int. Cl.
    *C05G 3/90*         (2020.01)
    *C05C 3/00*         (2006.01)
    *C05D 9/02*         (2006.01)
    *C05G 1/00*         (2006.01)
    *C05G 5/30*         (2020.01)

(52) U.S. Cl.
    CPC ................ *C05G 3/90* (2020.02); *C05G 5/12* (2020.02); *C05G 5/30* (2020.02); *C05G 5/38* (2020.02)

(56) References Cited

U.S. PATENT DOCUMENTS 5,352,265 A    10/1994    Weston et al.
2015/0052960 A1*    2/2015    Makin ..................... C05G 3/00 71/30

FOREIGN PATENT DOCUMENTS

| | | |
|---|---|---|
| CN | 103524221 B | 6/2015 |
| CN | 104860775 A | 8/2015 |
| CN | 106069441 A | 11/2016 |
| CN | 106588372 A | 4/2017 |
| EP | 0768993 B1 | 4/1997 |
| WO | 9212633 A1 | 8/1992 |
| WO | 9965845 A1 | 12/1999 |
| WO | 2006004424 A1 | 1/2006 |
| WO | 2006093413 A1 | 9/2006 |
| WO | 2014009326 A1 | 1/2014 |
| WO | 2017005695 A1 | 1/2017 |
| WO | 2017042194 A1 | 3/2017 |
| WO | 2017081183 A1 | 5/2017 |
| WO | 2017168288 A1 | 10/2017 |
| WO | 2018069456 A1 | 4/2018 |

OTHER PUBLICATIONS

Office action in related Chinese Application No. 201980030526.5, dated Nov. 3, 2021, 24 pages.
"Guidance for the compatibility of fertilizer blending materials" by EFMA, Brussels, Belgium, Jun. 2006. 16 pages.
Search Report Issued in International Application No. PCT/EP2019/061641, dated Aug. 27, 2019, 4 pages.
Search Report Issued in International Application No. PCT/EP2019/061894, dated Aug. 27, 2019, 3 pages.
Search Report Issued in International Application No. PCT/EP2019/062036, dated Aug. 30, 2019, 3 pages.

* cited by examiner

UREA AMMONIUM SULPHATE-BASED COMPOSITION AND METHOD FOR THE MANUFACTURE THEREOF

SUMMARY OF THE INVENTION

This invention relates to a homogeneous, solid, particulate, urea ammonium sulphate-based composition, further comprising a urease inhibitor of the type phosphoric triamide, in particular N-(n-butyl) thiophosphoric triamide (nBTPT) and magnesium sulphate, which improved properties for reducing ammonia loss by urease activity in the soil. The invention further relates to a method for the manufacture of a homogeneous, solid, particulate urea ammonium sulphate-based composition comprising urea, ammonium sulphate, a urease inhibitor of the type phosphoric triamide, in particular N-(n-butyl) thiophosphoric triamide (nBTPT) and magnesium sulphate. The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is the basic constituent for any living system as a constituent of protein.

Due to intensive farming and the reduction of sulphur emissions in the air by industry and the subsequent supply to the ground via rain, modern agriculture requires sulphur in addition to nitrogen.

Good agricultural practice usually require nitrogen and sulphur in a ratio 10/1 to 5/1 in order to answer to the crop demand, for example 150 kg nitrogen/ha/year and 30 kg sulphur/ha/year.

Lack of sulphur results both in a lower quantity and a lower quality of crops, and sulphur deficiency is often reflected in the content and type of proteins. Sulphur is indeed a major element entering into the chemistry of the cells in molecules such as amino acids (cysteine, methionine, etc.). It is also a catalyst for the photosynthesis and, in some cases, may improve the fixation of atmospheric nitrogen.

Conventionally, sulphur has been applied to the soil in the form of elemental sulphur, or as compounds such as ammonium sulphate, ammonium bisulphate, thiosulphates, sulphides or gypsum, or in combination with other fertilizer materials such as urea, for example as a physical blend of urea and ammonium sulphate, or as a co-granulated urea and ammonium sulphate material, the latter which is hereinafter called urea ammonium sulphate, abbreviated as UAS.

Like urea, the urea that is present in UAS is also hydrolysed in the soil under the action of an enzyme catalyst, commonly called urease, to produce ammonia and carbon dioxide. Ureases are found in numerous bacteria, fungi, algae, plants and some invertebrates, as well as in soils, as a soil enzyme. Urease activity tends to increase the pH of its environment as the ammonia is dissolved into the water in the soil, which is taken up by the plants as their principle source of nitrogen. However, ammonia can also be released into the atmosphere, thus becoming unavailable for the plant root system, a process called ammonia volatilization. Up to 50 weight % of nitrogen can be lost as a result of the volatilization of ammonia, all depending on the soil type, water content, pH, climate conditions, etc.

The availability of nitrogen, originating from urea, to the root system of plants can be improved by combining (i.e. by incorporation or addition) a urease inhibitor with a urea-containing fertilizer. Urease inhibitors are compounds that are capable of temporarily reducing the activity of the enzyme and slow down the rate at which urea is hydrolysed. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-containing fertilizer, phosphoric tri-amide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, especially when applied as a liquid, which is the most common commercially available form, is not stable when in contact with a urea ammonium sulphate-based composition, despite the fact that a urease inhibitor of the type phosphoric triamide is generally disclosed for use with urea ammonium sulphate-based fertilizers. Moreover, even a urease inhibitor of the type phosphoric triamide in an alkaline organic solvent, such as a mixture of propylene glycol and N-methylpyrrolidine, stabilised to allow for long storage time of the solution, is rapidly degraded once applied on a urea ammonium sulphate-based composition. Furthermore, the urease inhibitor of the type phosphoric triamide, also applied as a solid, is not stable when in contact with a urea ammonium sulphate-based composition. The problem is most relevant for the storage of said urea ammonium sulphate-based composition, where the urea ammonium sulphate-based composition in particulate form and the urease inhibitor of the type phosphoric triamide are in intimate contact with one another for a prolonged period of time.

This finding was most surprising, but stimulated the inventors to find a solution for the problem of stabilizing the urease inhibitor (i.e. reducing its degradation) in the presence of a urea ammonium sulphate-based composition in particulate form. In this context, stability refers to the property of a chemical compound, in particular the urease inhibitor compound of resisting chemically degradation in the presence of a urea ammonium sulphate-based composition in particulate form. An improved stability means a longer lifetime (or shelf life).

PRIOR ART

The problem of stabilizing a urease inhibitor (i.e. reducing its degradation), in particular nBTPT, in the presence of urea ammonium sulphate material is disclosed in WO2017042194 (Yara International, 2017), which discloses the addition of an alkaline or alkaline-forming inorganic or organic compound, selected from the group of metal oxides, carbonates, hydroxides, acetates, and organic bases, and mixtures thereof, in particular selected from the group of calcium oxide, zinc oxide, magnesium oxide, calcium carbonate, and mixtures thereof. However, it was found that, notwithstanding their stabilizing effects, the addition of said compounds induced the production of ammonia by the reaction of the urea ammonium sulphate with the alkaline compound, such as CaO. The release of ammonia may amount to 0.1 to 0.2 vol % during coating. Therefore, there is a need for a better stabilizer that stabilizes a urease inhibitor of the type phosphoric triamide in the presence of urea ammonium sulphate material, yet does not generate substantial amounts of ammonia, in particular by reaction with the urea ammonium sulphate material, in particular less than 0.1 vol %. CN106069441 (Xu et al., 2016) discloses a solid fertilizer composition comprising 20 wt % urea, 3 wt % ammonium sulphate, 0.4 wt % magnesium sulphate and 0.04 wt % nBPT. CN103896673 (Li et al., 2014) discloses a solid fertilizer composition comprising 10 wt % urea, 40 wt % ammonium sulphate, 0.5 wt % magnesium sulphate and 0.5 wt % nBPT. CN103896672 (Li et al., 2014) discloses a solid fertilizer composition comprising 60 wt % urea, 20 wt % ammonium sulphate, 5.0 wt % magnesium sulphate and 1.5 wt % nBPT.

STATEMENT AND SUMMARY OF THE INVENTION

Surprisingly, the inventors now found that the stability of the urease inhibitor of the type phosphoric triamide in the presence of a urea ammonium sulphate material can be greatly improved when a magnesium sulphate is applied to the urea ammonium sulphate material.

In its broadest concept, the invention is concerned with a homogeneous, solid, particulate, urea ammonium sulphate-based composition comprising urea ammonium sulphate, a urease inhibitor of the type phosphoric triamide and magnesium sulphate, characterized in that the UAS-based composition comprises 0.02 to 1 weight % of magnesium sulphate, 0.0001 to 1 weight % of the urease inhibitor and about 5 to about 30 weight % of ammonium sulphate.

By applying a magnesium sulphate to the urea ammonium sulphate-based composition comprising urea ammonium sulphate and a urease inhibitor of the type phosphoric triamide, the stability of the urease inhibitor of the type phosphoric triamide is greatly improved, leading, among others, to lower ammonia emissions, even when the urease inhibitor of the type phosphoric triamide was added to the urea ammonium sulphate-based composition a long time before the actual application on the field as a fertilizer.

Furthermore, it was found that the stabilizer according to the invention stabilizes a urease inhibitor of the type phosphoric triamide in the presence of urea ammonium sulphate material, and does not generate ammonia, in particular by reaction with the urea ammonium sulphate material.

By the integration of the stabilizer into the urea ammonium sulphate-based composition comprising a urease inhibitor of the type phosphoric triamide, the stability of the urease inhibitor of the type phosphoric triamide is greatly improved, especially during storage, such that lower amounts of said urease inhibitor may be used.

According to a particular embodiment of the present invention, the magnesium sulphate is present in the composition at a level of 0.02 to 1 weight %, preferably 0.05 to 1 weight %, relative to the total weight of the composition.

According to a particular embodiment of the present invention, the magnesium sulphate is selected from the group of anhydrous, mono-, di-, tri-, tetra-, penta-, hexa-, heptahydrate, and mixtures thereof.

According to a particular embodiment of the present invention, the magnesium sulphate has a purity of >70%, preferably >80%, more preferably >90%, most preferably >99%.

According to a particular embodiment of the present invention, the urease inhibitor of the type phosphoric triamide is a compound of formula I:

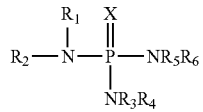

Formula I wherein:

X is oxygen or sulphur;

$R_1$ is alkyl, cycloalkenyl, aralkyl, aryl, alkenyl, alkynyl, or cycloalkyl;

$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system;

$R_3$, $R_4$, $R_5$ and $R_6$ are individually hydrogen or alkyl having 1 to 6 carbon atoms; and alkyl, cycloalkenyl, aralkyl, aryl, alkenyl, alkynyl, and cycloalkyl refer to compounds having from 1 to 10 carbon atoms, preferably from 1 to 6 carbon atoms.

According to a particular embodiment of the present invention, the urease inhibitor the urease inhibitor is N-(n-butyl) thiophosphoric triamide (nBTPT).

According to a particular embodiment of the present invention, the urease inhibitor, in particular N-(n-butyl) thiophosphoric triamide (nBTPT) is present in the urea-based blend composition at a level of 0.0001 to 1 weight %, preferably 0.02 to 0.2 weight %, most preferably 0.03 to 0.06 weight %, relative to the total weight of the urea-based blend composition.

According to a particular embodiment of the present invention, the weight ratio of urease inhibitor of the type phosphoric triamide to magnesium sulphate ranges from 1:20 to 1:1, preferably from 1:15 to 1:1, more preferably from 1:10 to 1:1

According to a particular embodiment of the present invention, the urease inhibitor is applied onto the urea ammonium sulphate-based composition in liquid or in particulate form, is melt-mixed with the urea ammonium sulphate-based compound, or a combination thereof.

According to a particular embodiment of the present invention, the urea ammonium sulphate-based composition further comprises an alkaline or alkaline-forming compound, selected from the group of calcium oxide, zinc oxide, magnesium oxide, calcium carbonate, and mixtures thereof.

According to a particular embodiment of the present invention, the weight ratio of said alkaline or alkaline-forming compound to magnesium sulphate ranges from 1:20 to 1:2, preferably from 1:15 to 1:2, more preferably from 1:10 to 1:2.

According to a preferred embodiment of the present invention, the ammonium sulphate-based composition further comprises anti-caking and/or moisture-repellent and/or anti-dust material, preferably applied as a coating to the urea ammonium particulate material.

According to a particular embodiment of the present invention, the anticaking and/or moisture-repellent and/or anti-dust coating comprising at least a non-polar material, in particular a liquid organic material, such as an oil, wax, resin or the like and any mixture thereof and is present in the composition at a level of 0.0001 to 1 weight %, preferably 0.02 to 0.5 weight %, most preferably 0.1 to 0.2 weight %, relative to the total weight of the composition.

According to a particular embodiment of the present invention, the UAS is a co-granulated material, preferably obtained from melt-mixing molten urea and solid particulate ammonium sulphate, obtained from compacting finely divided solid urea and ammonium sulphate powders, or obtained from a chemical process for the production of urea from carbon dioxide and ammonia, wherein ammonia is neutralized to form ammonium sulphate (AS) in the urea melt or solution to produce UAS, or wherein the UAS is a particulate blend of particulate urea and particulate ammonium sulphate.

According to a particular embodiment of the present invention, the average particle size (dp50) of the urea ammonium sulphate-based compound in particulate form is between 1 mm and 5 cm, as determined by mesh sieve screening.

According to a particular embodiment of the present invention, the urea ammonium sulphate-based composition comprises about 5 to about 30 weight % of ammonium sulphate, 0.03 to 0.06 weight % of nBTPT, 0.05 to 0.1 weight % of magnesium sulphate, and 0.015 to 0.03 weight % of magnesium oxide; adding up to 100 weight %, being the total weight of the composition.

In its broadest concept, the invention is also concerned with the use of the homogeneous, solid, particulate urea ammonium sulphate-based composition according to the invention as a fertilizer, in particular for supporting the growth of agricultural products on a sulphur-deficient soil.

In its broadest concept, the invention is also concerned with a method for the manufacture of a homogeneous, solid, particulate, urea ammonium sulphate-based composition according to the invention, the method comprising the steps of:

1) providing a urea ammonium sulphate material, comprising about 5 to about 30 weight % of ammonium sulphate;

2) providing 0.02 to 1 weight %, relative to the total weight of the composition, of a magnesium sulphate;

3) providing 0.0001 to 1 weight %, relative to the total weight of the composition, of a urease inhibitor of the type phosphoric triamide, preferably N-(n-butyl) thiophosphoric triamide (nBTPT);

4) optionally, providing 0.001 to 0.5% weight %, relative to the total weight of the composition, of an alkaline or alkaline-forming compound, selected from the group of calcium oxide, zinc oxide, magnesium oxide, calcium carbonate, and mixtures thereof, and 5) optionally, providing coating material wherein the coating material is able to increase at least the anticaking and/or moisture repellence and/or anti-dust properties of said urea ammonium sulphate-based composition; and 6) adding the components provided in steps 2), 3), 4) and 5) in any order to the component, provided in step 1).

In its broadest concept, the invention is also concerned with a kit of parts, comprising an amount of a) magnesium sulphate;

b) a urease inhibitor of the type phosphoric triamide, preferably N-(n-butyl) thiophosphoric triamide (nBTPT);

c) an alkaline or alkaline-forming compound, selected from the group of calcium oxide, zinc oxide, magnesium oxide, calcium carbonate, and mixtures thereof, and d) optionally, one or more anti-caking and/or moisture-repellent and/or anti-dust compounds.

In its broadest concept, the invention is also concerned with a method for improving the stability of a urease inhibitor of the type phosphoric triamide, in particular N-(n-butyl) thiophosphoric triamide, (nBTPT) in an urea ammonium sulphate-based composition comprising urea ammonium sulphate and 0.0001 to 1 weight % urease inhibitor, by the addition to said composition of 0.02 to 1 weight %, relative to the total weight of the composition, of a magnesium sulphate, and optionally, by the addition of 0.001 to 0.5 weight %, relative to the total weight of the composition, of an alkaline or alkaline-forming compound, selected from the group of calcium oxide, zinc oxide, magnesium oxide, calcium carbonate, and mixtures thereof.

The invention will now be described in more detail.

DETAILED DESCRIPTION OF THE INVENTION

Within the context of this application, with a particulate form is meant a physical form that can also be designated as granulated, prilled, crystalline, compacted, powdered, and the like, wherein the respective compound is in a small unit form.

"About" as used herein referring to a measurable value such as a parameter, an amount, a temporal duration, and the like, is meant to encompass variations of +/−20% or less, preferably +1-10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

Magnesium Sulphate

According to a particular embodiment of the present invention, the invention is concerned with a homogeneous, solid, particulate, urea ammonium sulphate-based composition comprising urea ammonium sulphate, a urease inhibitor of the type phosphoric triamide and magnesium sulphate, characterized in that the UAS-based composition comprises 0.02 to 1 weight % of magnesium sulphate, 0.0001 to 1 weight % of the urease inhibitor and about 5 to about 30 weight % of ammonium sulphate.

According to a particular embodiment of the present invention, the magnesium sulphate is present in the composition at a level of 0 0.02 to 1 weight %, preferably 0.05 to 1 weight %, relative to the total weight of the composition. From experiments, it was observed that more than 1 weight % did not produce a proportionally better stabilizing effect.

Magnesium sulphate is an inorganic salt with the chemical formula $MgSO_{4.x}(H_2O)$ where $0 \leq x \leq 7$. It is solid at room temperature and is available in powder form with various average particle sizes ($d_{50}$), such as between 5 and 1000 µm. A variety of hydrates is known. The heptahydrate $MgSO_4 \cdot 7(H_2O)$ (epsomite) can be prepared by neutralizing sulfuric acid with magnesium carbonate or oxide, but it is usually obtained directly from natural sources. The heptahydrate readily loses one equivalent of water to form the hexahydrate. The monohydrate, $MgSO_4 \cdot H_2O$ is found as the mineral kieserite. It can be prepared by heating the hexahydrate to approximately 150° C. Further heating to approximately 200° C. gives anhydrous magnesium sulphate.

According to a particular embodiment of the present invention, the magnesium sulphate is selected from the group of anhydrous, mono-, di-, tri-, tetra-, penta-, hexa-, heptahydrate, and mixtures thereof. Preferably, the magnesium sulphate is anhydrous magnesium sulphate. It was found that presence of water molecules in the magnesium sulphate had some negative influence on the hygroscopic quality of the urea ammonium sulphate.

According to a particular embodiment of the present invention, the magnesium sulphate has a purity of >70%, preferably >80%, more preferably >90%, most preferably >99%.

The magnesium sulphate may be applied to the composition of the present invention by common application techniques, such as coating and blending techniques, well known to the skilled person, such as spray-coating and drum-coating. It is preferred that the magnesium sulphate and the urease inhibitor of the type phosphoric triamide is in intimate contact with each other, in order for the magnesium sulphate to be effective. This can be achieved, most preferably, through the application of the urease inhibitor of the type phosphoric triamide, the magnesium sulphate, and optionally the anticaking and/or moisture-repellent coating to the particles, either successively, or simultaneously, for example as a liquid anticaking and/or moisture-repellent coating composition comprising the urease inhibitor of the type phosphoric triamide and the magnesium sulphate.

Urease Inhibitor

According to a particular embodiment of the present invention, the invention is concerned with a homogeneous, solid, particulate, urea ammonium sulphate-based composition comprising urea ammonium sulphate and a urease inhibitor of the type phosphoric triamide, in particular N-(n-butyl) thiophosphoric triamide (nBTPT), wherein the urease inhibitor of the type phosphoric triamide is a compound of formula I:

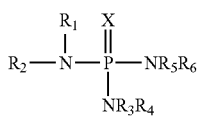

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cycloalkyl as used herein, refer to compounds having from up to 10 carbon atoms, preferably up to 6 carbon atoms. The lowest number of carbon atoms is between 1-3 depending on the structure of the substituent.

nBTPT is sold as the most effective known urease inhibitor and has the following chemical formula II

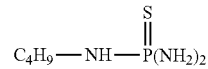

Formula II

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea ammonium sulphate-based composition at a level of 0.0001 to 1 weight %, preferably 0.02 to 0.2% weight %, most preferably 0.03 to 0.06 weight %, relative to the total weight of the urea ammonium sulphate-based composition.

As generally referred to herein and unless indicated otherwise, weight % refers to the weight percentage of an ingredient of a composition, relative to the total weight of said composition.

According to one embodiment, the weight ratio of urease inhibitor of the type phosphoric triamide to magnesium sulphate ranges from 1:20 to 1:1, preferably from 1:15 to 1:1, more preferably from 1:10 to 1:1. An exemplary weight ratio is 1:10.

According to one embodiment, the urease inhibitor can be a liquid at room temperature, a liquid at elevated temperature, or a solid which is dissolved (solution) or suspended (suspension) into a liquid carrier, all of which are different liquid forms of the urease inhibitor of the type phosphoric triamide, in particular N-(n-butyl) thiophosphoric triamide (nBTPT).

In embodiments where the urease inhibitor of the type phosphoric triamide, in particular N-(n-butyl) thiophosphoric triamide (nBTPT), is used as a liquid, it is preferably used as a 0.1 to 75 weight % solution, preferably as a 15 to 30 weight % solution, relative to the total weight of the solution. Commercial solutions are available, for example as Agrotain® Ultra (Koch, US), N Yield™ (Eco Agro, The Netherlands), Rhodia Ag-Rho™ N Protect B (Solvay, Germany), Iper N-Protect Liquid (Van Iperen, The Netherlands) and BASF Limus (BASF, Germany).

In embodiments where the urease inhibitor nBTPT is used as a liquid, dissolved into a carrier, it can be used as a powder, dissolved in propylene glycol, for example as 17.5 weight % of nBTPT. It is available from Yara International ASA (Norway) as Amiplus® liquid.

Experiments showed that, in compositions according to the invention, less urease inhibitor of the type phosphoric triamide, in particular N-(n-butyl) thiophosphoric triamide (nBTPT) needs to be used than is commonly employed in the prior art. For example, according to the invention, an amount of 0.05 weight % is most preferred, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment.

In embodiments where the urease inhibitor is used in its solid form, it is used as a powder, preferably with a purity of 99 weight % or more. It is available, for example, from Sunfit Chemical Co. (China).

The urease inhibitor of the type phosphoric triamide, in particular N-(n-butyl) thiophosphoric triamide (nBTPT) can be applied to the composition comprising the urea ammonium sulphate particles by common coating and blending techniques, well known to the skilled person, such as spray-coating and drum-coating.

The urease inhibitor of the type phosphoric triamide, in particular N-(n-butyl) thiophosphoric triamide (nBTPT) can also be applied to the urea ammonium sulphate-based composition by hot melt mixing, as described in U.S. Pat. No. 5,352,265 (Weston et al., 1994) for urea, which discloses that nBTPT is incorporated into the homogeneous granular fertilizer composition by blending a concentrated solution of nBTPT in a solvent selected from the group of liquid amides, 2-pyrrolidone, and N-alkyl 2-pyrrolidones, directly into the molten urea prior to its granulation.

Further Alkaline or Alkaline-Forming Compounds (Co-Stabilizer)

According to a particular embodiment of the invention, the urea ammonium sulphate-based composition further comprises an alkaline or alkaline-forming compound, selected from the group of calcium oxide, zinc oxide, magnesium oxide, calcium carbonate, and mixtures thereof.

Surprisingly, it was found that the addition of an amount of one or more of the abovementioned compounds increases the stability properties of magnesium sulphate to stabilize a urease inhibitor of the type phosphoric triamide in the presence of urea ammonium sulphate material, without generating substantial amounts of ammonia, in particular by reaction with the urea ammonium sulphate material.

According to one embodiment, the weight ratio of said alkaline or alkaline-forming compound to magnesium sulphate ranges from 1:20 to 1:2, preferably from 1:15 to 1:2, more preferably from 1:10 to 1:2. Exemplary weight ratios are about 1:10 and about 1:3, i.e. the amount of alkaline or alkaline-forming compound is always smaller than the amount of magnesium sulphate. According to one embodiment, the amount of alkaline or alkaline-forming compound is 2, 3, 5 or even 10 times smaller than the amount of magnesium sulphate. According to one embodiment, the amount of alkaline or alkaline-forming compound ranges between 0.001 and 0.5 weight % relative to the total weight of the UAS-based composition.

Coating

According a particular embodiment of the present invention, the urea ammonium sulphate-based composition according to the invention further comprises anti-caking and/or moisture-repellent and/or anti-dust material, applied onto the particulate components of the urea ammonium sulphate-based composition as a coating, wherein the coating comprises at least a non-polar material, in particular a liquid organic material, such as an oil, wax, resin or the like and any mixture thereof and is present in the composition at a level of 0.0001 to 1 weight %, preferably 0.02 to 0.5 weight %, most preferably 0.1 to 0.2 weight %, relative to the total weight of the composition.

Examples of suitable anticaking and/or moisture-repellent coatings are vegetable oil (e.g. rapeseed or neem), paraffin and Novoflow anti-caking and/or moisture repellence agents (Novochem Fertilizer Additives, The Netherlands).

Preferably, the moisture-repellent coating is a coating such as disclosed in EP 0768993 A1 (Norsk Hydro ASA) for a nitrogen-containing fertilizer, comprising at least a wax, an oil and a resin which is oil-soluble and miscible with wax.

Urea Ammonium Sulphate

The urea ammonium sulphate is a co-granulated material and may be obtained in several ways, such as by melt-mixing molten urea and solid particulate ammonium sulphate by a process of adding solid particulate ammonium sulphate to molten urea in a granulation step, such as a drum or a pan, as described in U.S. Pat. No. 3,785,796 (Tennessee Valley Authority, 1974), or using a fluidized bed granulator, as described, for example in WO 99/65845 (SKW Stickstoffwerke Piesteritz GmbH, 1999) or as used by Yara in its plants in Sluiskil (The Netherlands).

Alternatively, the urea ammonium sulphate may also be prepared according to WO 92/12633 (FMC Corp., USA) or the like, as a compacted material wherein a finely divided solid urea and ammonium sulphate powder is compacted, together with a microcrystalline cellulose to form pastilles, tablets and the like.

Alternatively, the urea ammonium sulphate may be obtained in a chemical process for the production of urea from carbon dioxide and ammonia, wherein ammonia is neutralized to form ammonium sulphate (AS) in the urea melt or solution to produce UAS, as disclosed in WO 2006/004424 A1 (Yara International ASA, Norway), and more specifically using a pipe reactor as a tail end process of a classical urea plant, as disclosed in WO 2006/093413 A1, Yara International ASA, Norway). In a specific embodiment, the ammonia neutralization may be effected in the scrubber by sulphuric acid and recycling into the urea melt and granulation.

In the abovementioned cases, the UAS granules are homogeneous in composition, i.e. each granule comprises in principle the same materials.

Alternatively, the UAS may be a particulate blend of particulate urea and particulate ammonium sulphate, for example in powder form, coated onto the particulate urea. In such case, each granule comprises not the same materials.

Independently of its method of production, UAS may contain from about 5 to about 30 weight % of ammonium sulphate (AS), preferably 10 weight % or more, relative to the total weight of the UAS, of which the remainder of the weight is preferably urea. Preferred grades comprise about 23 to about 30 weight % of AS [such as YaraVera® Amidas™ (40-0-0 5.5 S), Yara International ASA, which is a homogeneous granular fertilizer containing urea and ammonium sulphate with a 7.3:1 N to S ratio, and YaraVera® Ureas™ (38-0-0 7.5 S), Yara International ASA, which is a homogeneous granular fertilizer containing urea and ammonium sulphate with a 5:1 N to S ratio].

Preferably, to serve as a fertilizer, the average particle size (dp50) of the urea ammonium sulphate-based compound should be between 1 mm and 5 cm, preferably between 1 and 20 mm, preferably between 1 and 10 mm, preferably between 1 and 6 mm, preferably between 2 and 4 mm, most preferably between 3.2 and 3.5 mm, as determined by mesh sieve screening.

According to a particular embodiment of the present invention, the urea ammonium sulphate-based composition comprises about 5 to about 30 weight % of ammonium sulphate, 0.03 to 0.06 weight % of nBTPT, 0.05 to 0.1 weight % of magnesium sulphate, and 0.015 to 0.03 weight % of magnesium oxide, adding up to 100 weight %, being the total weight of the composition.

Use

According to a particular embodiment of the invention, the present invention further provides for the use of the homogeneous, solid, particulate urea ammonium sulphate-based composition as a fertilizer, in particular for supporting the growth of agricultural products on a sulphur-deficient soil. Sulphur-deficient soils are a growing problem: since sulphur is a component of numerous protein enzymes that regulate photosynthesis and nitrogen fixation, when S is limiting, there is less chlorophyll production, which makes the younger leaves of the plant appear yellow, a symptom sometimes confused with N-deficiency.

Manufacturing

According a particular embodiment of the present invention, the invention further relates to a method for the manufacture of a homogeneous, solid, particulate urea ammonium sulphate-based composition comprising urea ammonium sulphate, magnesium sulphate, and a urease inhibitor of the type phosphoric triamide, in particular N-(n-butyl) thiophosphoric triamide (nBTPT).

In particular, the invention relates to a method for the manufacture of a homogeneous, solid, particulate, urea ammonium sulphate-based composition according to the invention, the method comprising the steps of:

1) providing a urea ammonium sulphate material, comprising about 5 to about 30 weight % of ammonium sulphate;

2) providing 0.02 to 1 weight %, relative to the total weight of the composition, of a magnesium sulphate;

3) providing 0.0001 to 1 weight %, relative to the total weight of the composition, of a urease inhibitor of the type phosphoric triamide, preferably N-(n-butyl) thiophosphoric triamide (nBTPT);

4) optionally, providing 0.001 to 0.5 weight %, relative to the total weight of the composition, of a compound, selected from the group of calcium oxide, zinc oxide, magnesium oxide, calcium carbonate, and mixtures thereof, 5) optionally, providing coating material, wherein the coating material is able to increase at least the anticaking and/or moisture repellence and/or anti-dust properties of said urea ammonium sulphate-based composition; and 6) adding the components provided in steps 2), 3), 4) and 5) in any order to the component, provided in step 1).

It was found that the order of addition of the components magnesium sulphate, a urease inhibitor of the type phosphoric triamide, a stabilizer, a co-stabilizer and the coating material was had little effect on the performance of the claimed effects.

Kit of Parts

According a particular embodiment of the present invention, the invention further relates to a kit of parts, comprising an amount of a) magnesium sulphate;

b) a urease inhibitor of the type phosphoric triamide, preferably N-(n-butyl) thiophosphoric triamide (nBTPT);

c) a compound, selected from the group of calcium oxide, zinc oxide, magnesium oxide, calcium carbonate, and mixtures thereof, and d) optionally, one or more anticaking and/or moisture-repellent and/or anti-dust compounds.

The components of such kit of parts can then be added to solid particulate urea ammonium sulphate in a desired amount to obtain the homogeneous, solid, particulate, urea ammonium sulphate-based composition comprising urea ammonium sulphate and a urease inhibitor of the type phosphoric triamide according to the invention.

According to one embodiment, the components are provided in separate units. According to another embodiment, the components are premixed and provided in a combined unit. Preferably, they are premixed in a given weight ratio of urease inhibitor of the type phosphoric triamide to magnesium sulphate to of 1:20 to 1:1, preferably 1:15 to 1:1, more preferably 1:10 to 1:1.

Finally, the invention concerns a method for improving the stability of a urease inhibitor of the type phosphoric triamide, in particular N-(n-butyl) thiophosphoric triamide (nBTPT), in a urea ammonium sulphate-based composition comprising urea ammonium sulphate and 0.0001 to 1 weight % of the urease inhibitor, by the addition to said composition of 0.02 to 1 weight %, relative to the total weight of the composition, of a magnesium sulphate.

Detailed embodiments have been discussed herein above and in the following examples.

The preferred embodiments of the method according to the invention will now be illustrated by means of the following non-limitative examples.

EXAMPLES

EXPERIMENTAL

1. Volatilization Measurements (Ammonia Release 2 L Diffusion Kit)

200 g of UAS product, treated with nBTPT/stabilizer are put in a 2 L plastic container. Through the lid, a Draeger tube is placed for the measurement of vol % ammonia. The Draeger tube turns from yellow to bleu/purple when ammonia is absorbed by the tube. The amount of vol % ammonia released can be followed in time.

2. nBTPT Measurements

For lab scale experiments, 1.2 kg of solid fertilizer material was added to a lab scale drum. In a next step, the nBTPT/stabilizer material was slowly added. A residence time of 10 minutes was applied and the rotating speed of the drum was consequently the same in each experiment. In case a moisture-repellent coating was added, a nebulizer was used and depending on the order of addition, the moisture-repellent coating was added before or after addition of the nBTPT material. Before use, the moisture-repellent coating was preheated to 80° C. Larger scale experiments with amounts up to 40 kg of fertilizer material were performed in a concrete mixer.

The samples were stored under several conditions, dependent on the type of samples:
 Bagged at room temperature (18-25° C.)
 Bagged at 40° C.
 Open to air at room temperature (18-25° C.)

3. HPLC Analysis of nBTPT-Content

HPLC analysis of nBTPT is done as described in the procedure CEN 15688-2007.

4. Products

UAS was obtained from Yara as granules YaraVera® Amidas 40-0-0 (product code PA421X).

Solid N-(n-butyl)thiophosphoric triamide was obtained from Sunfit Chemical Co. (China) (CAS-Nr. 94317-64-3), as a white crystalline solid with a melting point of 58-60° C.

MgO technical grade was obtained from Mannekus & Co B.V., Schiedam, The Netherlands (dp(50)=27 μm, +/−90% purity, 2-2.9% CaO, 1.1% SiO2).

CaO technical grade was obtained from VWR International, Oud-Heverlee, Belgium (91.3% pure, 2.7% CaCO$_3$ and 6% Ca(OH)$_2$), dp(50)=22 μm).

CaCO$_3$ (limestone powder) was obtained from Nordkalk AB, Finland (98.5% pure, dp(50)=7 μm).

CaSO$_4$ anhydrous was obtained from Alfa Aesar, Haverhill, USA.

MgSO$_4$ anhydrous, 99.999%, was obtained from Alfa Aesar, Haverhill, USA.

MgSO$_4$ anhydrous, >99.5%, was obtained from Alfa Aesar, Haverhill, USA.

MgSO$_4$ anhydrous, >98%, was obtained from Ekmekciogullari, Turkey.

MgSO$_4$.7H$_2$O, >99.5%, was obtained from Merck KGaA, Darmstadt, Germany.

Coating: Moisture-repellent (MR) coating was made according to EP 0768993 A1 (Norsk Hydro ASA) by mixing about 28 weight % of wax, about 68 weight % of oil and about 4 weight % of a resin, applied in an amount of about 0.1-0.5 weight % to the fertilizer. It will be referred herein as NH-coating.

Experiment 1 (Ammonia Release)

Figure 1:
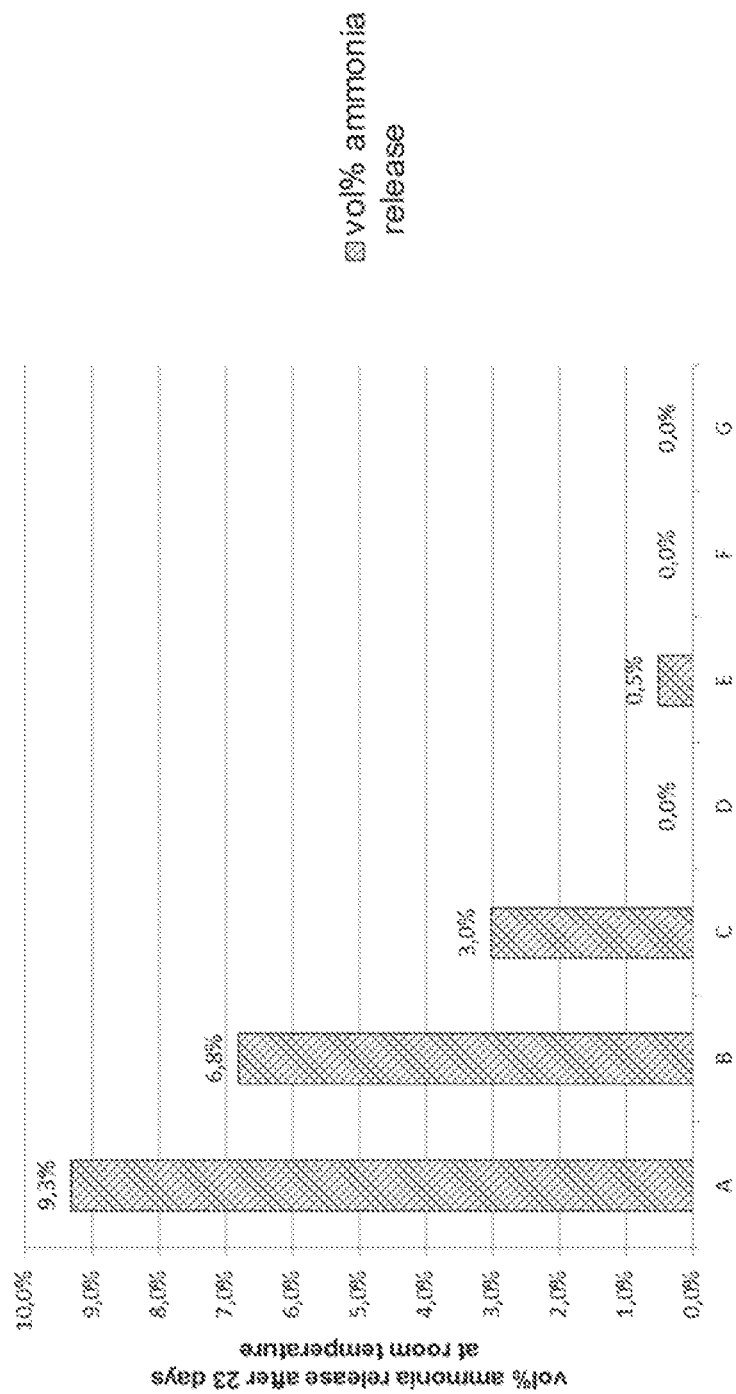
FIG. 1. Ammonia release of a YaraVera® Amidas product comprising 462 ppm nBTPT, treated with several stabilizers (see Table 1).

Experiment 1 defines the problem. FIG. 1 shows the ammonia release of a YaraVera® Amidas product comprising 462 ppm nBTPT, treated with several stabilizers. The numbers between brackets represent, for each stabilizer compound, the weight ratio of the said stabilizer compound compared to nBTPT.

TABLE 1

Ammonia release with different stabilizers

| Example | Stabilizer composition |
|---|---|
| A (prior art) | MgO (4.3) |
| B (prior art) | CaO-G-0554 (5.5) |
| C (prior art) | MgO (0.86) |
| D (prior art) | none |
| E (prior art) | CaCO$_3$ (9.98) |
| F (prior art) | CaSO$_4$ (12.1) |
| G | MgSO$_4$ (10.7) |

Although compounds such as MgO and CaO are mentioned in the prior art document WO2017042194 (Yara International, 2017) as most effective stabilizers for nBTPT in the presence of a urea ammonium sulphate material, these compounds are observed as producing ammonia in the presence of said material, which is an unwanted effect of these stabilizers. Only without stabilizer, and with MgSO$_4$ and with CaSO$_4$, there is no ammonia release.

Experiment 2

Figure 2A:
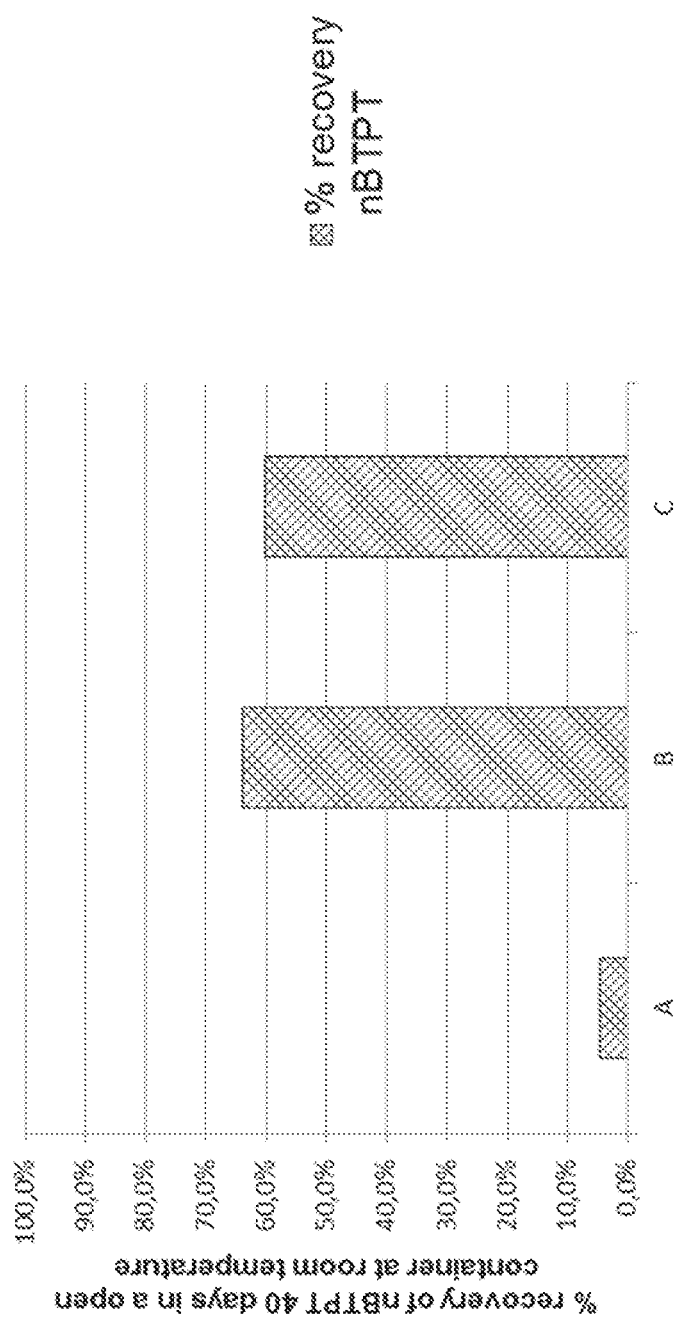
FIG. 2A. Stability of nBTPT on a YaraVera® Amidas product comprising 462 ppm nBTPT in plastic containers open to air at room temperature after 40 days [A=no stabilizer; B=CaO (2541 ppm); C=$MgSO_4$ 99.5% purity (4957 ppm)].
Figure 2B:
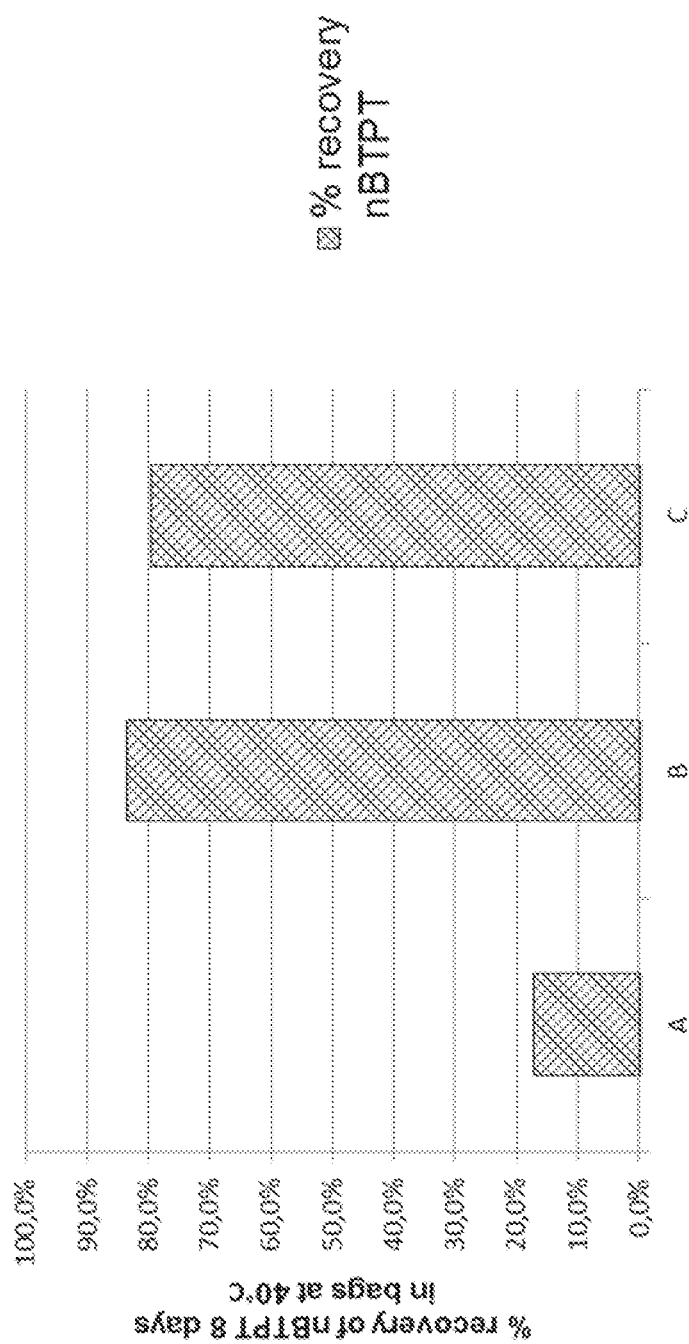
FIG. 2B. Stability of nBTPT on a YaraVera® Amidas product comprising 462 ppm nBTPT, in bags at 40° C. [A=no stabilizer; B=CaO (2541 ppm); C=$MgSO_4$ 99.5% purity (4957 ppm)] after 8 days.

This experiment was conducted to show the difference between the beneficial effect of the addition of an alkaline or alkaline-forming inorganic or organic compound (CaO— prior art) and MgSO$_4$ (VWR grade 99.5%) to UAS on the stability of nBTPT in the presence of UAS open to the air at room temperature (FIG. 2A) and in bags at elevated temperature (FIG. 2B). As can be seen, the stabilizing effect of MgSO$_4$ is comparable with the effect of the prior art compound (CaO), but no ammonia is generated (as shown in FIG. 1).

Experiment 3 (Different Grades)

Figure 3:
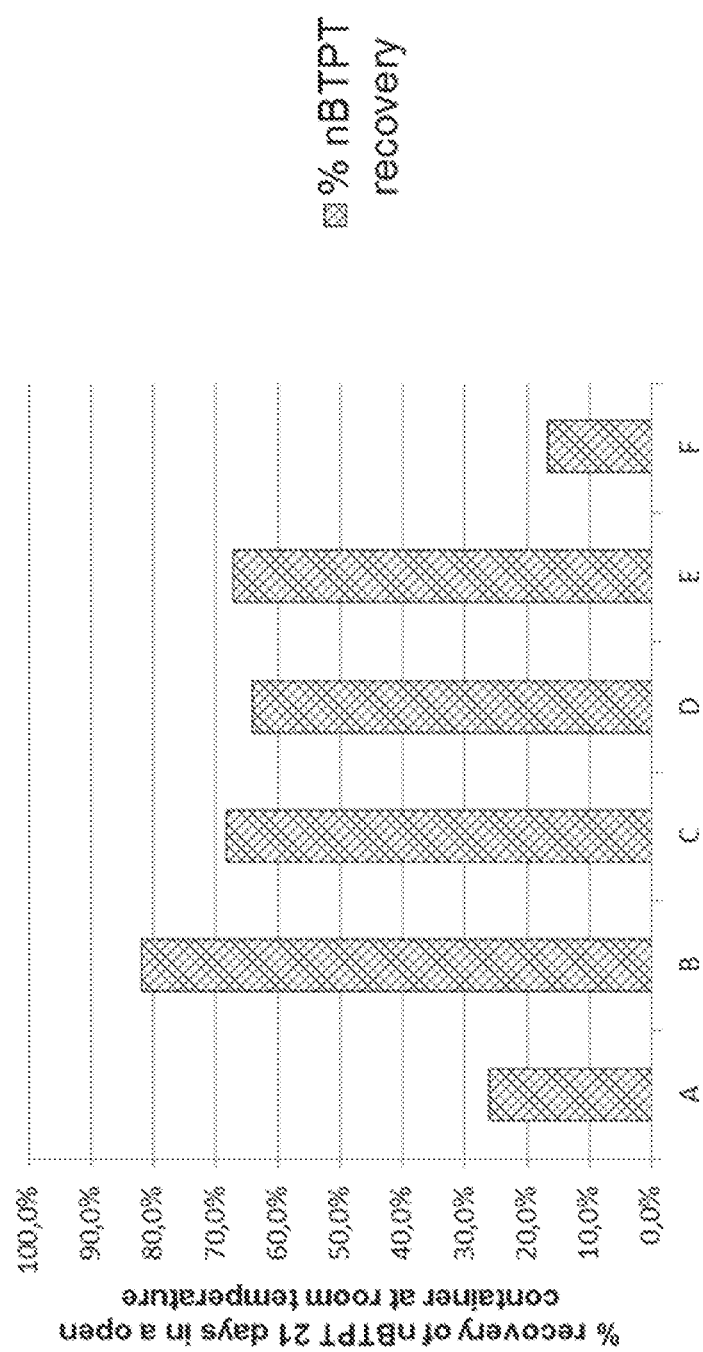
FIG. 3. Stability of nBTPT on a YaraVera® Amidas product comprising 462 ppm nBTPT using different grades and forms of $MgSO_4$ and $Na_2SO_4$, stored in open plastic containers at room temperature for 21 days. [A=no stabilizer; B=CaO (2541 ppm); C=$MgSO_4$ 99.5% purity (4957 ppm); D=$MgSO_4$ 99.999% purity (4957 ppm); E=$MgSO_4 \cdot 7H_2O$ (10163 ppm); F=$Na_2SO_4$ (5849 ppm)]
Figure 4:
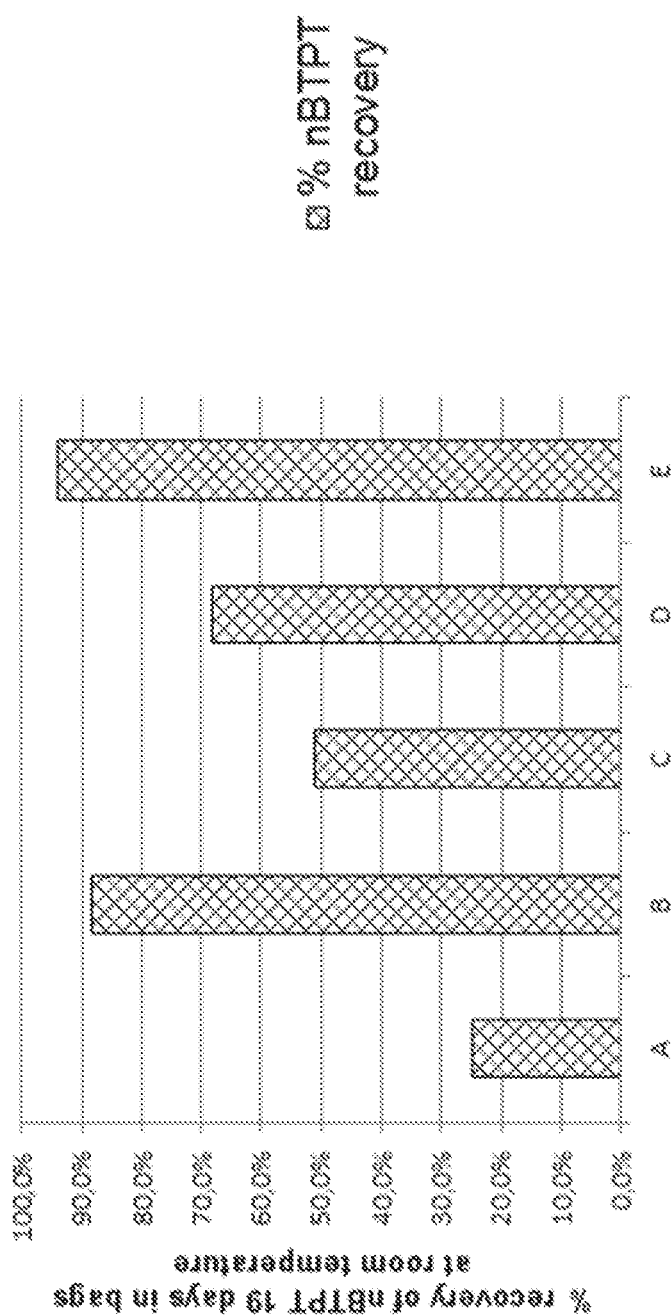
FIG. 4. Stability of nBTPT on a YaraVera® Amidas product comprising 462 ppm nBTPT using different $MgSO_4$/MgO combinations [A=no stabilizer; B=CaO (2310 ppm); C=MgO (212 ppm); D=MgSO$_4$>98% grade (4620 ppm); E=MgSO$_4$>98% grade (924 ppm)/MgO (212 ppm)]

This experiment shows the effect of the addition of different grades and forms of MgSO$_4$ and also another sulphate, Na$_2$SO$_4$, compared to the prior art compound CaO for open to air storage conditions at room temperature (FIG. 3). All MgSO$_4$ grades give a comparable nBTPT stability on the YaraVera® Amidas product. This experiment shows that the stabilizing effect of MgSO$_4$ on nBTPT on UAS is not 100% based on a pH effect (alkaline pH 8.5 for MgSO$_4$ 99.5% versus acidic pH 6.1 for MgSO$_4$ 99.999%) and also not 100% based on the waterbinding effect of anhydrous MgSO$_4$ as MgSO$_4$.7H$_2$O delivers similar nBTPT stability. Na$_2$SO$_4$ actually has a negative effect on the stability of nBTPT. This shows the unique stabilizing effect of magnesium sulphate.

Experiment 4 (Effect of Addition of Oxides and Synergetic Effect of MgSO$_4$ and MgO)

This experiment shows the effect of the addition of a small amount of oxide to the stabilizer. Small amounts of MgSO$_4$, which have little effect, become very effective in a combination with MgO (see D versus F). The effect is synergetic (see C+D versus F) and not additive. There is almost no difference in stability depending on the method of combining the components of the stabilizer composition (i.e. adding the components one by one in any order/making a pre-mix of the components and adding the pre-mix to UAS). MgO was found more effective than CaO, but it is assumed that any alkaline or alkaline-forming compound, selected from the group of calcium oxide, zinc oxide, magnesium oxide, calcium carbonate, and mixtures thereof, is effective.

We claim:

1. A homogeneous, solid, particulate, urea ammonium sulphate (UAS)-based composition comprising urea ammonium sulphate, a phosphoric triamide urease inhibitor and magnesium sulphate, wherein the UAS-based composition comprises 0.02 to 1 weight % of magnesium sulphate, 0.0001 to 1 weight % of the urease inhibitor and about 5 to about 30 weight % of ammonium sulphate.

2. The urea ammonium sulphate-based composition according to claim 1, wherein the magnesium sulphate is selected from the group consisting of anhydrous, mono-, di-, tri-, tetra-, penta-, hexa-, heptahydrate, and mixtures thereof.

3. The urea ammonium sulphate-based composition according to claim 2, wherein the magnesium sulphate has a purity of >70%.

4. The urea ammonium sulphate-based composition of claim 3 wherein the purity of the magnesium sulphate is >90%.

5. The urea ammonium sulphate-based composition of claim 4 wherein the purity of the magnesium sulphate is >99%.

6. The urea ammonium sulphate-based composition according to claim 1, wherein the ammonium sulphate-based composition further comprises anti-caking and/or moisture-repellent and/or anti-dust material.

7. The urea ammonium sulphate-based composition according to claim 6, wherein the anticaking and/or moisture-repellent material comprises a non-polar material, and is present in the composition at a level of 0.0001 to 1 weight %, relative to the total weight of the composition.

8. The urea ammonium sulphate-based composition according to claim 7, wherein the non-polar material is a liquid organic material selected from the group consisting of an oil, wax, resin and mixtures thereof.

9. The urea ammonium sulphate-based composition according to claim 7, wherein the level of non-polar material in the composition is 0.02 to 0.5 weight %.

10. The urea ammonium sulphate-based composition according to claim 6, wherein the anti-caking and/or moisture-repellent and and/or anti-dust material is applied as a coating to the urea ammonium particulate material.

11. The urea ammonium sulphate-based composition according to claim 1, wherein the urea ammonium sulphate-based composition further comprises an alkaline or alkaline-forming compound, selected from the group consisting of calcium oxide, zinc oxide, magnesium oxide, calcium carbonate, and mixtures thereof.

12. The urea ammonium sulphate-based composition according to claim 11, wherein the weight ratio of alkaline or alkaline-forming compound to magnesium sulphate ranges from 1:20 to 1:2.

13. The urea ammonium sulphate-based composition according to claim 12, wherein the weight ratio of alkaline or alkaline-forming compound to magnesium sulphate ranges from 1:10 to 1:2.

14. The urea ammonium sulphate-based composition according to claim 11, wherein the alkaline or alkaline-forming compound is magnesium oxide.

15. The urea ammonium sulphate-based composition according to claim 1, wherein the urease inhibitor, is present at a level of 0.02 to 0.2 weight %, relative to the total weight of the urea ammonium sulphate-based composition.

16. The urea ammonium sulphate-based composition of claim 15 wherein the urease inhibitor is N-(n-butyl)thiophosphoric triamide.

17. The urea ammonium sulphate-based composition of claim 15, wherein the urease inhibitor is present at a level of 0.03 to 0.06 weight %.

18. The urea ammonium sulphate-based composition according to claim 1, wherein the weight ratio of phosphoric triamide urease inhibitor to magnesium sulphate ranges from 1:20 to 1:1.

19. The urea ammonium sulphate-based composition according to claim 18 wherein the weight ratio of phosphoric triamide urease inhibitor to magnesium sulphate ranges from 1:10 to 1:1.

20. The urea ammonium sulphate-based composition according to claim 1, wherein the UAS is a co-granulated material, and wherein ammonia is neutralized to form ammonium sulphate (AS) in the urea melt or solution to produce UAS, or the UAS is a particulate blend of particulate urea and particulate ammonium sulphate.

21. The urea ammonium sulphate-based composition according to claim 20, wherein the co-granulated material is obtained from: (i) melt mixing molten urea and solid particulate ammonium sulphate, (ii) compacting finely-divided solid urea and ammonium sulphate powders, or (iii) a chemical process for the production of urea from carbon dioxide and ammonia.

22. The urea ammonium sulphate-based composition according to claim 1, wherein the magnesium sulphate is present in the composition at a level of 0.05 to 1 weight %, relative to the total weight of the composition.

23. The urea ammonium sulphate-based composition according to claim 1, wherein the phosphoric triamide urease inhibitor is a compound of formula I:

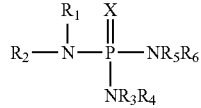

Formula I wherein:
X is oxygen or sulphur;
R$_1$ is alkyl, cycloalkeny wherein the urease inhibitor, is present at a level of 0.02 to 0.2 weight %, relative to the total weight of the urea ammonium sulphate-based composition.

24. The urea ammonium sulphate-based composition according to claim 1, wherein the urease inhibitor is N-(n-butyl) thiophosphoric triamide (nBTPT).

25. The urea ammonium sulphate-based composition according to claim 1, wherein the urea ammonium sulphate-based composition is obtained by (i) applying the phosphoric triamide urease inhibitor onto the urea ammonium sulphate-based composition in liquid or in particulate form, (ii) melt-mixing with the urea ammonium sulphate-based compound, or (iii) a combination thereof.

26. The urea ammonium sulphate-based composition according to claim 1, wherein the average particle size (dp50) of the urea ammonium sulphate-based compound in particulate form is between 1 mm and 5 cm, as determined by mesh sieve screening.

27. The urea ammonium sulphate-based composition according to claim 1, wherein the urea ammonium sulphate-based composition comprises about 5 to about 30 weight % of ammonium sulphate, 0.03 to 0.06 weight % of nBTPT, 0.05 to 0.1 weight % of a magnesium sulphate, and 0.015 to 0.03 weight % of magnesium oxide, adding up to 100 weight %, being the total weight of the composition.

28. A method comprising fertilizing a soil with the homogeneous, solid, particulate urea ammonium sulphate-based composition as claimed in claim 1.

29. A method for the manufacture of a homogeneous, solid, particulate, urea ammonium sulphate-based composition according to claim 1, the method comprising the steps of:
  1) providing a urea ammonium sulphate material, comprising about 5 to about 30 weight % of ammonium sulphate;
  2) providing 0.02 to 1 weight %, relative to the total weight of the composition, of a magnesium sulphate;
  3) providing 0.0001 to 1 weight %, relative to the total weight of the composition, of a phosphoric triamide urease inhibitor;
  4) optionally, providing 0.001 to 0.5 weight %, relative to the total weight of the composition, of an alkaline or alkaline-forming compound, selected from the group consisting of calcium oxide, zinc oxide, magnesium oxide, calcium carbonate, and mixtures thereof, and
  5) optionally, providing coating material, wherein the coating material is able to increase at least the anticaking and/or moisture repellence and/or anti-dust properties of said urea ammonium sulphate-based composition; and
  6) adding the components provided in steps 2), 3), 4) and 5) in any order to the component, provided in step 1).

30. The method of claim 29, wherein the phosphoric triamide of step 3) is N-(n-butyl) thiophosphoric triamide.

31. The method of claim 29, wherein the alkaline or alkaline-forming compound is magnesium oxide.

* * * * *